Nov. 3, 1942.    J. F. KOVALSKY    2,300,510
REGULATING APPARATUS
Filed June 28, 1940
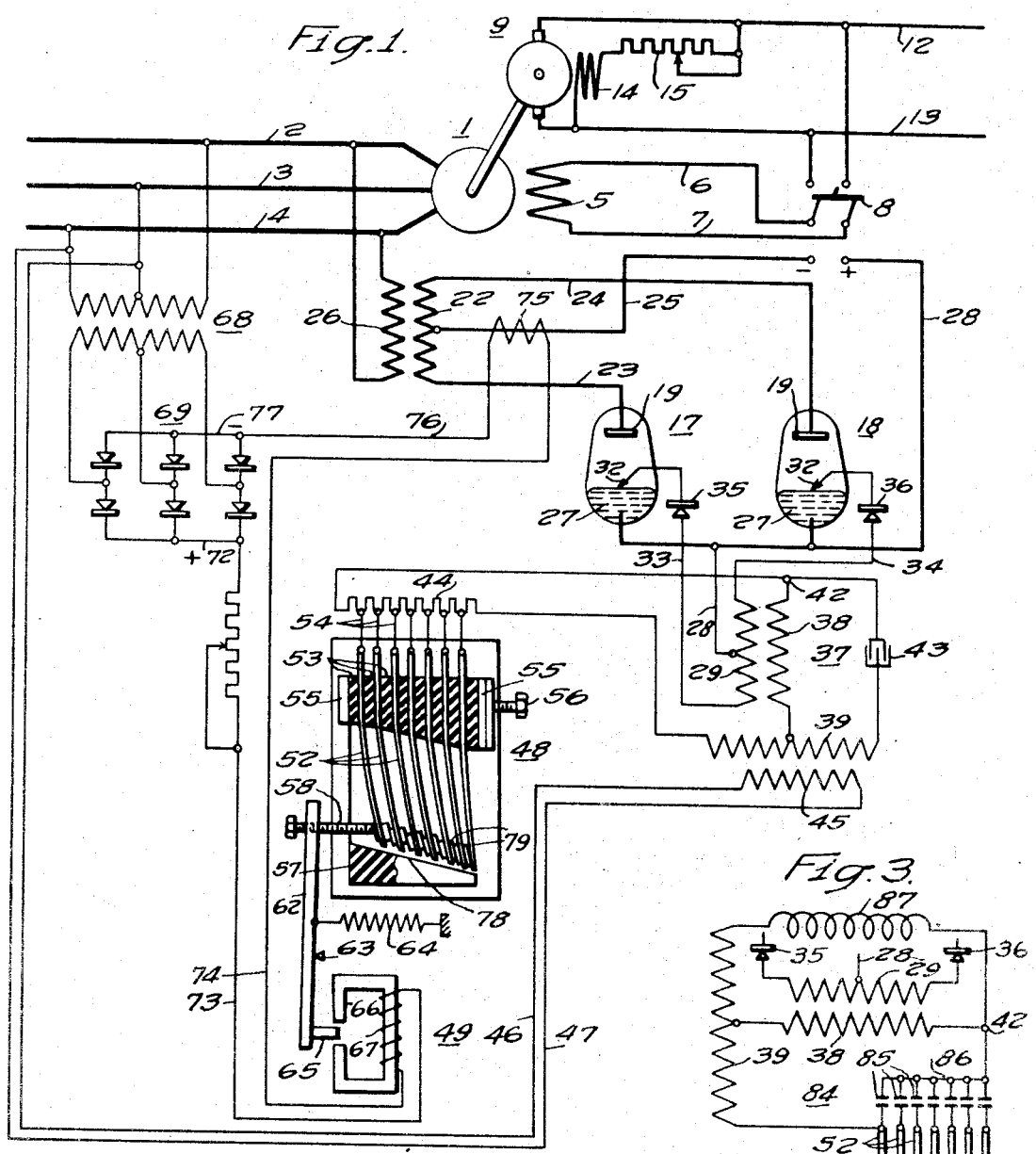
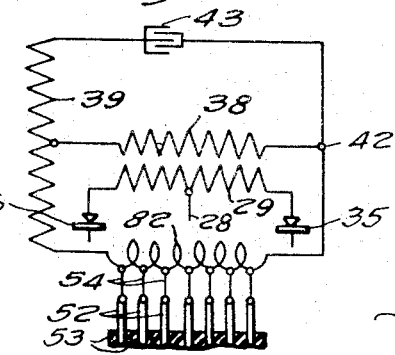
WITNESSES:
E. A. McCloskey
Nm. C. Groome
INVENTOR
Joseph F. Kovalsky.
BY
Franklin E. Hardy
ATTORNEY Patented Nov. 3, 1942

2,300,510

UNITED STATES PATENT OFFICE 2,300,510

REGULATING APPARATUS

Joseph F. Kovalsky, Turtle Creek, Pa., assignor to Westinghouse Electric & Manufacturing Company, East Pittsburgh, Pa., a corporation of Pennsylvania Application June 28, 1940, Serial No. 342,949

6 Claims. (Cl. 171—119)

This invention relates to regulating apparatus, and particularly to regulators such as are employed for controlling the excitation of dynamo-electric machines.

It is an object of the invention to provide for supplying unidirectional current from an alternating-current source, such as an alternating-current generator, through controlled rectifier means to the generator field winding, or to an exciter generator supplying current to the main generator field winding, and to control the output from the rectifier means by operation of a variable impedance device of the character disclosed for maintaining the desired excitation on the alternating-current generator.

More specifically, it is an object of the invention to provide a regulating system of the above-indicated character in which the output of the rectifier means is controlled by varying an impedance device in a control circuit by electroresponsive means that is sensitive to the output voltage of the generator, or to some other electric characteristic of the generator being regulated.

Other objects and advantages of the invention will be apparent from the following description of a preferred embodiment thereof, reference being had to the accompanying drawing, in which:

Figure 1 is a diagrammatic illustration of circuits and apparatus comprising one preferred form of the invention; and Figs. 2 and 3 are diagrammatic illustrations of modifications of a portion of the system shown in Fig. 1.

Referring to the drawing, an alternating-current generator 1 is provided having an armature winding connected to three phase circuit conductors 2, 3 and 4 and a field winding 5 connected by conductors 6 and 7 to a two-pole switch 8, which may be moved to either of two circuit closing positions for connecting the field winding 5 to a supply of unidirectional current energy. An exciter 9 is provided having an armature winding that is connected to supply conductors 12 and 13, and a field winding 14 that is connected between conductors 12 and 13 through a variable rheostat 15 for controlling the output voltage of the exciter which, when the switch 8 is in its upper circuit closing position, provides a source of energy for the field winding 5. This source is available during the starting of the generator for bringing its voltage to substantially its normal value, after which the switch 8 may be moved to its lower circuit closing position to connect the field winding 5 to the controlled rectifier system to be described.

In the rectifier system, two ignitron-type rectifier units 17 and 18 are illustrated, which consist of igniter-controlled mercury-pool cathode tubes each having an anode 19 connected to opposite ends of a transformer winding 22 by conductors 23 and 24, respectively, the midpoint of the winding 22 providing the negative terminal for the rectifier system being connected to a conductor 25. The transformer winding 22 is inductively related to a primary winding 26 shown as connected between alternating-current conductors 2 and 4, which supplies the energy that is controlled by the ignitron rectifiers 17 and 18. The ignitron rectifiers 17 and 18 are also provided with mercury pool cathodes 27 which serve as the positive terminals of the rectifiers and are connected to a terminal conductor 28. The conductor 28 is also connected to the midpoint of a transformer winding 29, the opposite ends of which are connected through conductors 33 and 34, respectively, to the opposite ends of the transformer winding 29 to igniters 32 to control the firing of the ignitron rectifier devices 17 and 18. Valve devices 35 and 36 are provided in circuit with the conductors 33 and 34, respectively, to permit the flow of current from the cathodes 27 of the rectifier devices to the igniters 32 and to prevent its flow in the opposite direction. These valve devices may be the well-known dry type of rectifier.

The transformer winding 29 is connected to a phase-shifting circuit indicated generally at 37 through an inductively related winding 38, one end of which is connected to the midpoint of a transformer secondary winding 39 and the other end of which is connected to a junction point 42, between which and one end of the winding 39 a condenser 43 is connected. A variable impedance device 44, here shown as a resistor having a plurality of tap connections, is connected between the opposite end of the winding 39 and the junction point 42. The winding 39 is inductively related to a primary winding 45 that is connected by conductors 46 and 47 to the phase circuit conductors 3 and 4 to supply a single-phase alternating current to the phase shifting net-work 37 and having the same frequency as that supplied to the anode circuit of the rectifier devices 17 and 18.

For controlling the effective value of the impedance device 44, a regulating device is provided consisting generally of a leaf spring assembly indicated generally at 48 and a magnet structure for operating it, indicated generally at 49.

The leaf spring assembly 48 may correspond to the construction disclosed in the copending application of C. R. Hanna et al., Serial No. 203,-876, filed April 23, 1938, for Regulators, and assigned to the same assignee as this application.

This leaf spring assembly includes a plurality of flexible leaf spring contact members 52 that are arranged in a stack having corresponding ends thereof fixed against movement by being clamped between layers of fish-paper 53 which provide insulating barriers between adjacent members 52, which are connected by conductors 54 to spaced points along the resistor 44. The alternate layers of fish-paper 53 and leaf spring contact members 52 are held in a clamping device, shown as comprising plates 55 on opposite sides thereof, which are held in position by an adjustable pressure exerting member 56. The opposite ends of the leaf spring contact member 52 are free to move, and are biased slightly to the left as viewed in the drawing by the increasing lengths of the insulating layers 53 and into engagement with a stop 57 of insulating material for limiting their motion in a direction toward the left, as shown in the drawing, and for spacing the free ends of the spring elements 52 out of contact closing engagement with one another, except when moved from engagement with the stop by a driving member 58 carried on a movable arm 62 that is actuated in accordance with the energization of the magnet structure 49.

The arrangement of the magnet structure for mounting and actuating the movable arm 62 may correspond to that disclosed in the copending application of Ralph A. Geiselman, Serial No. 219,527, filed July 16, 1938, for Regulators, and assigned to the same assignee as this application. This structure is diagrammatically illustrated in Fig. 1 as providing a pivot 63, about which the lever arm 62 is adapted to move against the bias of a spring 64 in accordance with the force exerted on the armature 65 of magnetic material carried by the arm 62, and positioned within an air gap in the stationary core portion 66 of the magnetic circuit that is energized by a winding 67 in accordance with variations in the value of the quantity being regulated. In the embodiment of the invention illustrated in Fig. 1, the winding 67 is supplied with unidirectional current that is a measure of the average three-phase voltage of the generator 1 as supplied through a multi-phase transformer 68 and three units of a dry-type rectifier set 69. The energizing circuit of the winding 67 extends from the positive terminal 72 of the rectifier set 69 through conductor 73, the winding 67, conductor 74, the secondary winding of a feedback or stabilizing transformer 75 having its primary winding in circuit with the conductor 25 through conductor 76 to the negative terminal 77 of the rectifier set 69.

The block 57 of insulating material is so positioned with respect to the ends of the several leaf springs 52 that they are brought against the surface 78 thereof with a slight loading or biasing force due to the spring-like characteristic of the leaves 52, and are accurately spaced from one another at their free ends regardless of the lack of straightness of the individual leaves. Each of the individual leaf springs 52, which may be of bronze, carries a silver button 79 adjacent the outer free end thereof through which a circuit may be completed between adjacent leaf springs when so biased as to bring the contact members, or buttons 79, carried thereby into engagement.

The employment of the sloping surface 78 of the block 57 as a stop for spacing the members 52 permits the use of a large number of spring members 52 in a small space, since the required space between the adjacent leaf springs may be very small and may be accurately controlled. This arrangement permits a free unrestricted movement of the members 52 in a direction from the block 57 which does not exist where individual stops are provided between several contact controlling members, and where such members must necessarily be essentially stiff levers capable of independent operation as such, or are self-biasing members of sufficient rigidity to space themselves without the necessity of employing spacing stops. The close spacing of the members also results in a control device having a large number of steps controlled by a slight movement only of the driving member 58. The steps are so proportioned that the energy values controlled between any two adjacent spring members 52 are kept low in magnitude, thus avoiding burning or damage to the surface of the silver contact buttons 79.

During the starting of the generator, energy is supplied to the field winding 5 from a suitable direct-current source, such as the exciter 9, when the switch 8 is in its upper circuit closing position. During the starting operation, the output voltage of the generator 1 is increased to substantially its normal value, thus applying voltage to the winding 67 of the regulating device and to the transformer comprising windings 26 and 22. After the rectifier devices and control circuits have become energized the switch 8 may be operated to its lower circuit closing position connecting the field winding 5 between conductors 25 and 28 to receive energy from the ignitron rectifiers 17 and 18. Current is now supplied from the rectifier units 17 and 18 flowing from cathodes 27 through conductor 28, conductor 7, field winding 5, conductor 6, conductor 25, the opposite halves of the winding 22 and conductors 23 and 24 to the anodes 19 of the ignitron rectifier devices 17 and 18 and through the space between the anodes 19 and the mercury pool cathodes 27. The portion of each positive half-wave of the anode voltage of the devices 17 and 18 during which current will pass therethrough is determined by the phase relation between the anode voltage and the voltage supplied to the igniters 32 from the phase-shifting circuit 37, which is in turn controlled by the value of the variable impedance of the device 44 as controlled by the leaf spring assembly 48 and the magnet structure 49.

When the voltage of the generator 1 is low, the pull on the armature 65 is correspondingly low, and the spring 64 moves the arm 62 to its illustrated position in which position the several portions of the resistor 44 are short-circuited through the several leaf springs 52, resulting in a phase relation between the output from the transformer winding 29 to the igniters 32 that is nearly in phase with the anode voltage supplied from the winding 22, so that the rectifier devices 17 and 18 will start firing, or passing current therethrough, early in each positive half-cycle of the alternating current wave from the winding 22. This causes a large current supply to the field winding 5 which increases the output voltage of the generator 1, thus increasing the energization of the winding 67 and causing the lever 62 to move in a counter-clockwise direction against the force of the spring 64, permitting a number of the leaf springs 52 to come in engagement with the sloping surface 78 of the stop 57, the successive engagements of such springs with the stop being from the right to the left of the group shown in the drawing, thus introducing a portion of the resistor 44 in the phase-shifting network circuit which has the effect of shifting the phase angle relation of the alternating-current voltage supplied to the igniters 32 in a direction such that there is a greater time phase displacement between it and the anode voltage supplied to the rectifier units, causing the current flow through the igniters 32 to start at a later period during each positive half-wave cycle of the anode voltage to thereby decrease the amount of current output from the rectifier devices 17 and 18 an amount determined by the amount of variation in the effective value of impedance device 44. As the output voltage of the generator increases above or decreases below its desired value, the unbalance between the pull of the spring 64 and the pull on the armature 65 will be such as to vary the value of the impedance of the device 44 in the one or the other direction to correspondingly vary the time phase relation between the igniter voltage applied to the igniters 32 with respect to the anode voltage applied to anodes 19 to increase or decrease the output from the rectifier devices 17 and 18 supplied to the field winding 5 to thus maintain the desired voltage thereon. During the increase or decrease in the field winding current, the corresponding increase or decrease in the current flow through the conductor 25 will cause a voltage to be developed in the secondary winding 75 of the feedback transformer in a direction to modify the excitation supplied to the winding 67 in anticipation of the direction and rate of voltage change on the generator 1 that will follow from a change in field excitation current supplied thereto to thus introduce a stabilizing effect into the operation of the regulator system to prevent any appreciable over-correction above or below the desired value of output voltage of the generator upon operation of the regulator system.

Fig. 2 is a modification of the phase-shifting circuit shown in Fig. 1, in which the secondary winding 39 supplies energy to a network that is similar to that shown in Fig. 1, except that in place of the resistor 44 a reactor 82 is shown, so that the leaf spring assembly shown in Fig. 1 controls a reactance instead of a resistance.

Fig. 3 is, in general, similar to the phase-shifting circuit of Fig. 1, excepting that the controlled reactance device instead of being a resistor 44 or a reactor 82 is shown as a capacitor indicated generally by the numeral 84, and comprising a plurality of individual capacitors 85 each having one terminal connected to a common conductor 86 and the opposite terminals connected to the separate leaf springs 52 of the regulator device. To introduce a variable capacity between the junction point 42 and one end of the transformer winding 39, a reactance 87 is shown connected between the opposite terminal of the transformer winding 39 and the junction point 42 to provide a voltage of a different phase relation to that across the reactance device. In certain cases, if desired, a resistor may be substituted for the reactance coil 87.

It will be apparent to those skilled in the art that modifications in the circuits and apparatus here illustrated and described may be made within the spirit of my invention, and I do not wish to be limited otherwise than by the scope of the appended claims.

I claim as my invention:

1. In a regulator system, an alternating-current generator having a field winding, means for controlling the excitation of said field winding comprising igniter controlled rectifier means for receiving alternating-current energy from said generator and delivering unidirectional current to a field control circuit, means for controlling the output of said rectifier means including an impedance device and means for varying the effective value of the impedance device comprising a plurality of circuit controlling members arranged in a stack with corresponding ends supported in fixed relation and connected to separate points along the impedance device, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, means responsive to the generator voltage for actuating said circuit controlling members, and means responsive to an increase or decrease of the current supplied through said rectifier means for stabilizing the action of the last named means.

2. In a regulator system, an alternating-current generator having a field winding, means for controlling the excitation of said field winding comprising ignitron-type rectifier means for receiving alternating-current energy from said generator and delivering unidirectional current to a field control circuit, means for controlling the output of said ignitron-type rectifier means comprising a phase shift circuit and means for controlling said circuit including an impedance device and means for varying the effective value of the impedance device comprising a plurality of circuit controlling members arranged in a stack with corresponding ends supported in fixed relation and connected to separate points along the impedance device, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, electroresponsive means responsive to an electrical characteristic of the generator for actuating said circuit controlling members from engagement with the stop and into engagement with the adjacent members to short-circuit selected portions of the associated impedance device, and means responsive to an increase or decrease of current through said rectifier means for stabilizing the action of said electroresponsive means.

3. In a regulator system, means for regulating an electrical quantity comprising, in combination, an alternating-current power source, a control circuit, ignitron-type rectifier means for supplying unidirectional current to the control circuit from said source, means for controlling the output from said rectifier means including an impedance device and means for controlling the effective value of the impedance device comprising a plurality of contact members connected to separate points along said device, stop means for spacing the contact members when engaged thereby, said stop means being arranged to permit unlimited movement of the contact members away from the stop means, means for biasing said contact members to the positions limited by the stop means, means responsive to the regulated quantity actuated for moving said contact members from engagement with the stop for varying said impedance device, and means responsive to an increase or decrease of the current supplied through said rectifier means for stabilizing the action of the last named means.

4. In a regulator system, an alternating-current generator having a field winding, means for controlling the excitation of the field winding comprising ignitron-type rectifier means for receiving alternating-current energy from said generator and delivering unidirectional current energy to a field control circuit, means for controlling the output of said ignitron-type rectifier means including an impedance device and means for varying the effective value of the impedance device comprising a plurality of contact members connected to separate points on said impedance device, stop means for spacing the contact members relative to adjacent contact members, the relative movement between said contact members and said stop means being unrestricted in one direction, electroresponsively controlled means including an energizing winding for effecting the relative movement of said contact means and said stop means, means for supplying a unidirectional current to said electroresponsive means that is a measure of the generator output voltage, and means responsive to an increase or decrease of current through said rectifier means for stabilizing the action of said electroresponsive means.

5. In a regulator system, a dynamo-electric machine having a field winding, means for controlling the excitation of said field winding comprising an alternating current source of electrical energy, ignitron-type rectifier means for receiving alternating-current energy from said source and delivering unidirectional current to a field control circuit, means for controlling the output of said ignitron-type rectifier means including an impedance device and means for varying the effective value of the impedance device comprising a plurality of circuit controlling members arranged in a stack with corresponding ends supported in fixed relation and connected to separate points along the impedance device, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, means responsive to an electrical characteristic of said dynamo-electric machine for actuating said circuit controlling members, and means responsive to an increase or decrease of the current supplied through said rectifier means for stabilizing the action of the last named means.

6. In a regulator system, an alternating-current generator having a field winding, means for controlling the excitation of said field winding comprising ignitron-type rectifier means for receiving alternating-current energy from said generator and delivering unidirectional current to a field control circuit, means for controlling the output of said ignitron-type rectifier means comprising an ignitron control circuit and means for controlling said circuit including an impedance device and means for varying the effective value of the impedance device comprising a plurality of circuit controlling members arranged in a stack with corresponding ends supported in fixed relation and connected to separate points along the impedance device, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, electro-responsive means and a circuit for energizing said means in response to an electrical characteristic of the generator for actuating said circuit controlling members from engagement with the stop and into engagement with the adjacent members to short-circuit selected portions of the associated impedance device, and a stabilizing transformer included in said circuit for introducing a voltage component that is a measure of the energy supplied to said rectifier means.

JOSEPH F. KOVALSKY.